US012776841B2

(12) United States Patent
Van Voorthuisen et al.

(10) Patent No.: US 12,776,841 B2
(45) Date of Patent: Oct. 27, 2026

(54) 2D BEAM SELECTION PROCEDURE IN AN OPTICAL WIRELESS COMMUNICATION SYSTEM

(71) Applicant: SIGNIFY HOLDING B.V., Eindhoven (NL)

(72) Inventors: Paul Henricus Johannes Maria Van Voorthuisen, Sint Oedenrode (NL); Francisco David Rojas Calvente, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 168 days.

(21) Appl. No.: 18/857,849

(22) PCT Filed: Apr. 18, 2023

(86) PCT No.: PCT/EP2023/059977
§ 371 (c)(1),
(2) Date: Oct. 18, 2024

(87) PCT Pub. No.: WO2023/208644
PCT Pub. Date: Nov. 2, 2023

(65) Prior Publication Data

US 2025/0330242 A1 Oct. 23, 2025

(30) Foreign Application Priority Data

Apr. 25, 2022 (EP) .................................... 22169615

(51) Int. Cl.
*H04B 10/00* (2013.01)
*H04B 10/114* (2013.01)
*H04J 14/00* (2006.01)

(52) U.S. Cl.
CPC ..... *H04B 10/1149* (2013.01); *H04B 10/1143* (2013.01)

(58) Field of Classification Search
CPC ... H04B 10/11; H04B 10/112; H04B 10/1121; H04B 10/1123; H04B 10/1125;
(Continued)

(56) References Cited

U.S. PATENT DOCUMENTS 11,057,108 B1 7/2021 Mondragon et al.
2013/0265077 A1 * 10/2013 Yang ....................... H02S 50/10 324/761.01

(Continued)

FOREIGN PATENT DOCUMENTS

CN 205844514 U 12/2016

*Primary Examiner* — Daniel G Dobson

(57) ABSTRACT

An optical wireless communication device (100) comprising: a two-dimensional array of emitters (110) each emitter arranged to emit an optical signal and having an individual coverage area; wherein the two-dimensional array of emitters (110) is arranged to create a combined coverage area larger than the individual coverage area, with each individual coverage area evenly distributed within the combined coverage area; a receiver (120) configured to receive a feedback from a remote device in the combined coverage area; and a controller (101) configured to assign an address to each emitter out of the two-dimensional array of emitters, each address comprising a pair of codes representing coordinates on an X-axis and a Y-axis, respectively, according to a Cartesian coordinate system, to uniquely identify each emitter in the Cartesian coordinate system; wherein each emitter out of the two-dimensional array of emitters (110) is configured to send a beacon signal comprising its address for assisting the remote device to provide the feedback, with the plurality of emitters configured to send beacon signals according a Code-Division Multiple Access; and the controller (101) is configured to select an emitter out of the two-dimensional array of emitters (110) for establishing an optical wireless data link with the remote device according to the feedback received from the remote device.

15 Claims, 4 Drawing Sheets

(58) Field of Classification Search
CPC ............ H04B 10/1127; H04B 10/1129; H04B 10/114; H04B 10/1141; H04B 10/1143; H04B 10/1149; H04B 10/116; H04B 10/50; H04B 10/5057
See application file for complete search history.

(56) References Cited

U.S. PATENT DOCUMENTS

| | | | | |
|---|---|---|---|---|
| 2019/0353868 | A1* | 11/2019 | Renshaw ........... | G02B 26/0816 |
| 2021/0143906 | A1* | 5/2021 | Joseph ............... | H04B 10/0731 |
| 2024/0223281 | A1 | 7/2024 | Rojas Calvente et al. | |

* cited by examiner

2D BEAM SELECTION PROCEDURE IN AN OPTICAL WIRELESS COMMUNICATION SYSTEM

CROSS-REFERENCE TO PRIOR APPLICATIONS

This application is the U.S. National Phase application under 35 U.S.C. § 371 of International Application No. PCT/EP2023/059977, filed on Apr. 18, 2023, which claims the benefit of European Patent application Ser. No. 22/169,615.6, filed on Apr. 25, 2022. These applications are hereby incorporated by reference herein.

FIELD OF THE INVENTION

The invention relates to the field of optical wireless communication, such as Li-Fi communication. More particularly, various apparatus, systems, and methods are disclosed herein related to a secure optical wireless communication system.

BACKGROUND OF THE INVENTION

To enable more and more electronic devices like laptops, tablets, and smartphones to connect wirelessly to the Internet, wireless communication confronts unprecedented requirements on data rates and link qualities, and such requirements keep on growing year over year, considering the emerging digital revolution related to Internet-of-Things (IoT). Radio frequency technology like Wi-Fi has limited spectrum capacity to embrace this revolution. In the meanwhile, light fidelity (Li-Fi) is drawing more and more attention with its intrinsic security enhancement and capability to support higher data rates over the available bandwidth in visible light, Ultraviolet (UV), and Infrared (IR) spectra. Furthermore, Li-Fi is directional and shielded by light blocking materials, which provides it with the potential to deploy a larger number of access points, as compared to Wi-Fi, in a dense area of users by spatially reusing the same bandwidth. These key advantages over wireless radio frequency communication make Li-Fi a promising secure solution to mitigate the pressure on the crowded radio spectrum for IoT applications and indoor wireless access. Other possible benefits of Li-Fi may include guaranteed bandwidth for a certain user, and the ability to function safely in areas otherwise susceptible to electromagnetic interference. Therefore, Li-Fi is a very promising technology to enable the next generation of immersive connectivity.

Achieving a high data throughput and/or long range in a point-to-point OWC system, while maintaining a wide-angle coverage, is a challenge. This is not only because of the increased power requirements for the transmitter, but also because increasing the transmission power in optical systems above certain level is not always possible due to eye-safety requirements.

To address this problem, it is known to achieve overall coverage by using a set of small angle beams of which only one will be enabled for actual data communication, therefore reducing power consumption. Due to some overlapping of the beams, which is necessary to enable seamless switching between beams, a receiving device will detect a number of beams at the same time and will select the best one for communication.

SUMMARY OF THE INVENTION

To assist such a beam selection procedure, unique codes may be used to identify each transmitted beam. The number of required codes grows rapidly when placing the beam in a matrix to cover a certain area, e.g., growing quadratically for a square matrix. To select the correct beam at a remote receiver device, the received signal needs to be cross correlated with every possible CDMA code that the transmitter might use, generating a correlation peak whose amplitude corresponding to the received signal strength of each beam. Since cross correlation is a computationally expensive operation, with the increasing number of beams it becomes difficult to scale, especially when using a low-power processor with limited CPU and memory capabilities (e.g., a microcontroller) for decoding the signals.

By encoding each light beam by a pair of codes representing its coordinates in an emitter matrix, the quadratic growth of required codes is brought back to a linear growth. By using row and column properties each emitter in a beam array may be uniquely identified or addressed by those two parameters. As an example, emitters in a N×N beam array may be addressed by 2N codes, instead of $N^2$ codes. In this way, the number of transmitted codes for identifying a beam is reduced, which saves memory usage and transmission power of the transmitter. Accordingly, the complexity for detecting a beam is also reduced at the receiver side, e.g., the computation of cross-correlation is simplified.

In view of the above, the present disclosure is directed to methods, apparatus, and systems for providing an efficient 2D beam selection procedure in an optical wireless communication system. More particularly, the goal of this invention is achieved by an optical wireless communication device as claimed in claim 1, by an optical wireless communication system as claimed in claim 10, by a beam selection method of an optical wireless communication device as claimed in claim 13, and by a method of a remote optical receiver for assisting beam selection as claimed in claim 14.

In accordance with a first aspect of the invention an optical wireless communication device is provided. An optical wireless communication device comprises a two-dimensional array of emitters each emitter arranged to emit an optical signal and having an individual coverage area; wherein the two-dimensional array of emitters is arranged to create a combined coverage area larger than the individual coverage area, with each individual coverage area evenly distributed within the combined coverage area; a receiver configured to receive a feedback from a remote device in the combined coverage area; and a controller configured to assign an address to each emitter out of the two-dimensional array of emitters, each address comprising a pair of codes representing coordinates on an X-axis and a Y-axis, respectively, according to a Cartesian coordinate system, to uniquely identify each emitter in the Cartesian coordinate system; wherein each emitter out of the two-dimensional array of emitters is configured to send a beacon signal comprising its address for assisting the remote device to provide the feedback, with the plurality of emitters configured to send beacon signals according a Code-Division Multiple Access; and the controller is configured to select an emitter out of the two-dimensional array of emitters for establishing an optical wireless data link with the remote device according to the feedback received from the remote device.

The optical wireless communication may be carried out in visible light, Ultraviolet (UV), and Infrared (IR) spectra. Thus, the optical wireless communication may also be called a Li-Fi communication or a Visible Light Communication (VLC). Each emitter comprises at least a light source for optical data transmission. The light source may be one of a light-emitting diode (LED), a laser diode, a vertical-cavity surface-emitting laser (VCSEL), or an Edge Emitting Laser Diode (EELD). Preferably, the light source comprises at least one of a LED and a VCSEL.

It is known that to support high data rate optical wireless communication, it is efficient to use narrow beam emitters. However, with a single narrow beam emitter, the coverage area can be quite limited. Therefore, in a practical system, the overall coverage may be accomplished by deploying an array of small angle emitters in the transmitter side, and only the one with best alignment with a remote receiver will be enabled for data communication. In that sense, the transmitter achieves high data rate and large coverage with a relatively low power consumption.

Unique code sequences can be used to identify each emitter of the emitter array. However, the number of required unique code sequences grows rapidly with the increasing of the matrix size. Reduction of the number of code sequences can be addressing each emitter by a pair of codes to identify coordinates in the X-axis and a Y-axis, respectively, according to a Cartesian coordinate system. In this manner, an emitter is identified by the code combination. For example, a beam matrix of N×N would normally require $N^2$ different code sequences while emitting a combination of its row and column index would only require 2N different code sequences. It is clear that the reduction factor grows with the increase of the matrix size.

Since the pair of codes uniquely identifying an emitter out of the array, when each emitter is configured to send a beacon signal comprising its address and the plurality of emitter are configured to send the beacon signals simultaneously according to a Code-Division Multiple Access, a remote device will be able to distinguish the beacon signals from one another and provide a feedback to the optical wireless communication device. The feedback will then be used by the optical wireless communication device to select an emitter out of the array for data communication.

Beneficially, the codes used in the Cartesian coordinate system to address the emitters are orthogonal to each other.

The larger the code distance between any two codes used as coordinates in the Cartesian coordinate system, the easier for a remote device to distinguish an address from the beacon signals received from the optical wireless communication device. Therefore, it is preferable that all the codes are orthogonal to each other.

In one example, the axes of the Cartesian coordinate system are aligned with the row and column of the two-dimensional array horizontally and vertically.

The two-dimensional array of emitters is typically deployed as a matrix with a uniform layout, such that the separation distance between any two emitters in the same row or the same column is the same, e.g., d. The axes of the Cartesian coordinate system are used as references for addressing the emitters in the array. The axes may be aligned with the rows and columns of the two-dimensional array, or have a different orientation as compared to the rows and columns of the array.

When the axes are aligned with the row and column of the two-dimensional array, the separation distance between any two emitters sharing a same X-axis or Y-axis coordinate is the same as the physical separation distance between any two emitters in the same row or the same column, e.g., d.

In another example, the axes of the Cartesian coordinate system are rotated through an angle as compared to the row and column of the two-dimensional array to increase a minimum separation distance between any two emitters out of the two-dimensional array sharing a same X-axis or Y-axis coordinate.

To increase the separation distance between any two emitters sharing a same X-axis or Y-axis coordinate, it is beneficial to rotate the axes of the Cartesian coordinate system through an angle as compared to the row and column of the two-dimensional array. And then the minimum separation distance of two emitters sharing a same X-axis or Y-axis coordinate will be larger than d.

Beneficially, the axes of the Cartesian coordinate system are rotated by arctangent (0.5)-degree as compared to the row and column of the two-dimensional array.

This may maximize the minimum separation distance of two emitters sharing a same X-axis or Y-axis coordinate for an array with N×N size. For a different size of the matrix, another rotation angle may be even more beneficial.

In one option, the receiver is an RF receiver.

The feedback may be provided in a radio frequency channel according to a short-range wireless communication protocol, such as a Wi-Fi, BLE, or Zigbee standard.

In another option, the receiver is an optical receiver.

The feedback may also be provided in an optical spectrum, either same as the optical wireless data communication or another band.

Beneficially, the optical receiver is further configured to receive an optical data signal in a bi-directional optical wireless data link.

Advantageously, the two-dimensional array of emitters is arranged in a matrix along two orthogonal directions or in a hexagonal structure along two directions.

Although the optical transmitters may be arranged in an orthogonal array/matrix, it may be beneficial to use a hexagonal structure instead of a square or rectangular structure. A hexagonal structure allows for a reduced overlap of coverage areas of adjacent emitters.

In accordance with a second aspect of the invention, an optical wireless communication system is provided. An optical wireless communication system comprises an optical wireless communication device according to the present invention; a remote optical receiver comprising at least one photodiode configured to detect a plurality of beacon signals sent by the optical wireless communication device; a controller configured to decode a first address comprised in a beacon signal with a highest received signal strength out of the plurality of beacon signals; wherein the remote optical receiver is configured to provide a feedback on the first address to the optical wireless communication device, and the optical wireless communication device is configured to select a corresponding emitter according to the first address indicated in the feedback to establish an optical wireless communication link with the remote optical receiver.

Upon detecting the plurality of beacon signals sent by the optical wireless communication device, the remote optical receiver needs to identify a beacon signal with the strongest received signal strength. The emitter sends the beacon signal with the strongest received signal strength is the one best aligned with the remote optical receiver. Since the address information is embedded in the beacon signal, by distinguishing the beacon signal, the remote optical receiver can also decode the address of that emitter and provide a feedback to the optical wireless communication device on that decoded address.

The remote optical receiver comprises at least one photodiode. The photodiode may also be called a light detector, a photo detector or a photo sensor, which may be a PIN diode, an Avalanche Photo Diode (APD), or a photomultiplier. The field-of-view of the remote optical receiver may only cover a subset of the plurality of emitters of the optical wireless communication device. And then, the remote optical receiver may only detect a subset of the beacon signals transmitted by the optical wireless communication device, and the first address is selected from the subset of the beacon signals received by the remote optical receiver.

Beneficially, the controller of the remote optical receiver is configured to calculate cross-correlation results between the detected plurality of beacon signals with each of the codes used as coordinates in the Cartesian coordinate system of the optical wireless communication device, and to sum the cross-correlation results for each pair of codes representing coordinates on the X-axis and the Y-axis of the Cartesian coordinate system to derive a relative signal strength for each beacon signal, and the beacon signal with a highest received signal strength is selected according to the relative signal strength.

The emitters of the optical wireless communication device send the plurality of beacon signals simultaneously according to the code division multiple access. The detection of the beacon signals is based on cross correlation between local copies of the code sequences and the received overlayed beacon signals. Since the address of an individual emitter of the optical wireless communication device comprises a pair of codes, cross-correlation is carried out with each individual code, representing either an X-axis or a Y-axis. The sum of the cross-correlation results for each pair of codes representing the address of an individual emitter is used to estimate a relative signal strength for each beacon signal. Since the emitters all transmit with the same output power, the higher the relatively signal strength received by the remote optical receiver, the better alignment between that emitter and the remote optical receiver.

In one example, the remote optical receiver further comprises an RF transmitter or an optical transmitter to send the feedback on the first address to the optical wireless communication device.

The feedback to the optical wireless communication device may be provided in a radio frequency band or an optical band.

In a preferred setup, the remote optical receiver comprises an optical transmitter, and then a bi-directional optical data link may be established.

In accordance with a third aspect of the invention, a beam selection method is provided. A beam selection method comprises steps of an optical wireless communication device: emitting an optical signal and having an individual coverage area by each emitter out of a two-dimensional array of emitters of the optical wireless communication device; creating a combined coverage area by the two-dimensional array of emitters, with the combined coverage area larger than an individual coverage area of an emitter out of the two-dimensional array of emitters and each individual coverage area evenly distributed within the combined coverage area; assigning an address to each emitter out of the two-dimensional array of emitters, each address comprising a pair of codes representing coordinates on an X-axis and a Y-axis, respectively, according to a Cartesian coordinate system, to uniquely identify each emitter in the Cartesian coordinate system; sending by each emitter a beacon signal comprising its assigned address for assisting a remote device to provide a feedback; sending beacon signals by the plurality of emitters according to a Code-Division Multiple Access; receiving the feedback from the remote device in the combined coverage area; and selecting an emitter out of the two-dimensional array of emitters for establishing an optical wireless data link according to the feedback received from the remote device.

In accordance with a further aspect of the invention, a method of a remote optical receiver is provided. The method comprises steps of a remote optical receiver: detecting a plurality of beacon signals sent by the optical wireless communication device; decoding a first address comprised in a beacon signal with a highest received signal strength out of the plurality of beacon signals; and providing a feedback on the first address to the optical wireless communication device.

Beneficially, the method of the remote optical receiver further comprises steps of calculating cross-correlation results between the detected plurality of beacon signals with each of the codes used as coordinates in the Cartesian coordinate system of the optical wireless communication device; summing the cross-correlation results for each pair of codes representing coordinates on the X-axis and the Y-axis of the Cartesian coordinate system to derive a relative signal strength for each beacon signal; and selecting the beacon signal with the highest received signal strength according to the relative signal strength.

BRIEF DESCRIPTION OF THE DRAWINGS

In the drawings, like reference characters generally refer to the same parts throughout the different figures. Also, the drawings are not necessarily to scale, emphasis instead generally being placed upon illustrating the principles of the invention.

DETAILED DESCRIPTION OF EMBODIMENTS

The embodiments set forth below represent information to enable those skilled in the art to practice the embodiments. Upon reading the following description in light of the accompanying drawings, those skilled in the art will understand the concepts of the disclosure and will recognize applications of these concepts not particularly addressed herein. It should be understood that these concepts and applications fall within the scope of the disclosure.

In optical wireless systems intended for data communication (LiFi) the overall coverage can be accomplished by using a set of small angle beams of which only one will be enabled for data communication, therefore reducing power consumption. Unique code sequences can be used to identify each beam. However, the number of required unique code sequences grows rapidly when placing the beam in a matrix.

Reduction of the number of code sequences can be achieved by emitting two codes per beam. In this manner a beam or an emitter is identified by the code combination. For example, a beam matrix of 5×5 would normally require 25 different code sequences while emitting a combination of its row and column index would only require 10 different code sequences. Advantageously, the reduction factor grows when the matrix size increases.

For example, if each emitter transmits a single orthogonal code sequence, such as a CDMA code, a remote receiver obtains the signal strength of each beam by correlating the received signal with each used CDMA code. When the correlator output shows a clear peak, there is a match between the CDMA code and the code sequence present in the received signal. The peak amplitude indicates the received signal strength of corresponding beam.

$$A_{beam1} = Rx \otimes CDMA_1$$

However, when each emitter emits a pair of codes (e.g., its row and column code), the receiver needs to correlate with the corresponding two codes, respectively:

$$Rx \otimes (CDMA_i + CDMA_j)$$

Figure 1:
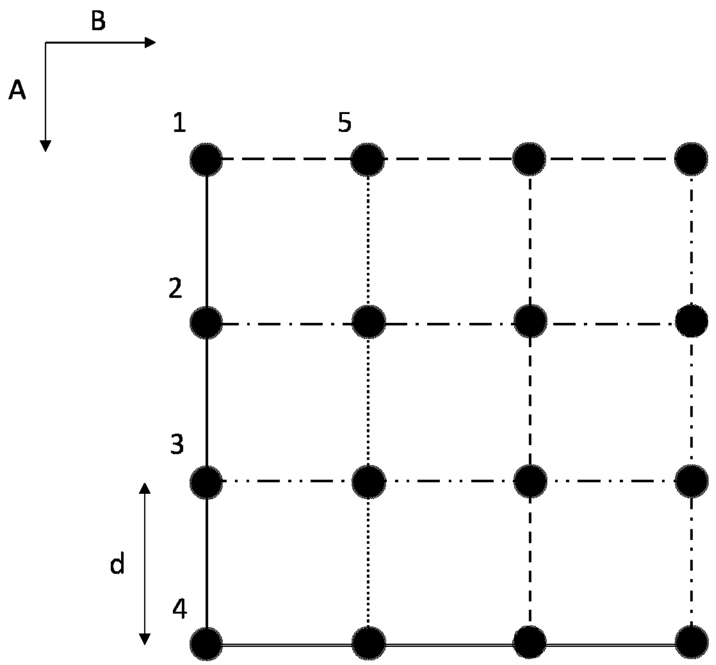
FIG. 1 illustrates an example of addressing a two-dimensional array of emitters according to the present invention.

FIG. 1 illustrates an example of addressing a two-dimensional array of emitters, with each solid dots representing an individual emitter. For the ease of illustration, the example is provided with a 4×4 beam array. It can be encoded using eight CDMA codes as indicated by solid and dash lines in directions A and B in FIG. 1. Directions A and B represents the X-axis and Y-axis of a Cartesian coordinate system used to address the plurality of emitters. Each line represents a different CDMA code. Thus, an emitter can be uniquely identified by a pair of codes representing coordinates on the X-axis and the Y-axis, respectively.

By using only 8 CDMA codes with 4 codes used to identify rows and 4 codes used to identify columns, the code pairs assigned to emitters are not fully orthogonal to each other, because each CDMA code is shared by 4 emitters either on the same row or on the same column. For example, to detect beam 1 the correlation would look like:

$$Rx \otimes (CDMA_{A1} + CDMA_{B1})$$

When, for example, the receiving device is exactly in the center of beam1, the correlation will detect $CDMA_{A1}$ and $CDMA_{B1}$ originating from beam1. On top of this, in case of overlapping beams, $CDMA_{A1}$ emitted by beam5 and $CDMA_{B1}$ emitted by beam2 will add to the result and gives a higher peak value. In general, with respect to the real signal strength of a beam, the correlator will show a positive offset. The amount of offset depends on the amount of overlap between the coverage area of adjacent emitters, and the actual position of the remote receiver.

The described effect can be counteracted by distributing the repeated CDMA codes such that their distance become larger, and that at least the code pairs for neighboring emitters become fully orthogonal. For the configuration of FIG. 1, the axes of the Cartesian coordinate system are aligned with the row and column of the two-dimensional array horizontally and vertically. Thus, the minimum repeated code distance (RCD) is "d", which is the separation distance between two emitters in the two-dimensional array. To obtain orthogonal addresses for neighboring emitters, the minimum RCD shall be increased to 2d.

Figure 2:
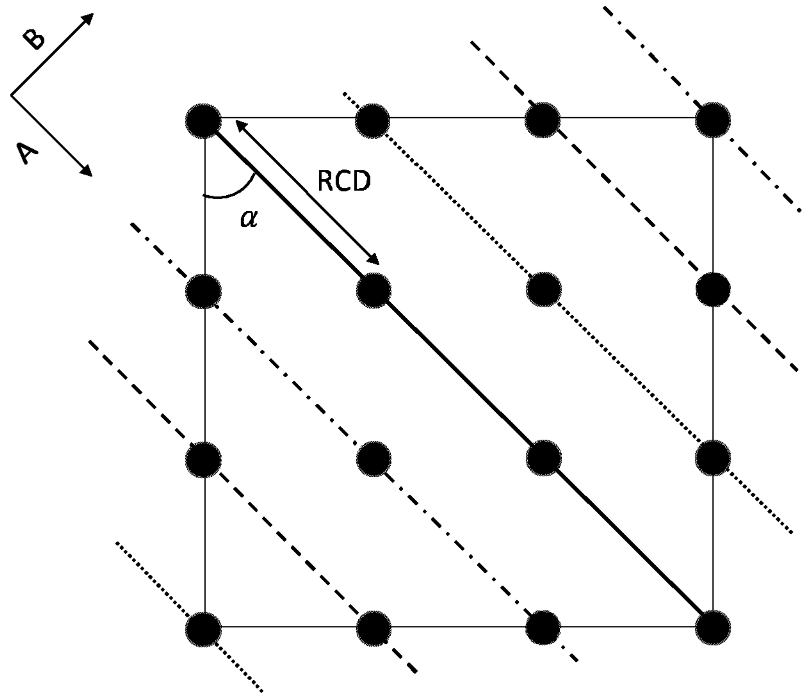
FIG. 2 illustrates another example of addressing a two-dimensional array of emitters according to the present invention.

FIG. 2 illustrates another example of addressing a two-dimensional array of emitters. Here, the assignment of code is only demonstrated for direction A. Note that direction B is perpendicular to direction A, and codes are assigned in the same approach as direction A. In the example of FIG. 2, the axes of the Cartesian coordinate system are no longer aligned with the row and column of the two-dimensional array horizontally and vertically. Instead, the axes of the Cartesian coordinate system are rotated through an angle (α) as compared to the row and column of the two-dimensional array to increase a minimum separation distance between any two emitters out of the two-dimensional array sharing a same X-axis or Y-axis coordinate. FIG. 2 shows a rotation angle (α) of 45-degree, which leads to a minimum Repeated Code Distance (RCD) of "$\sqrt{2}$d".

Figure 3:
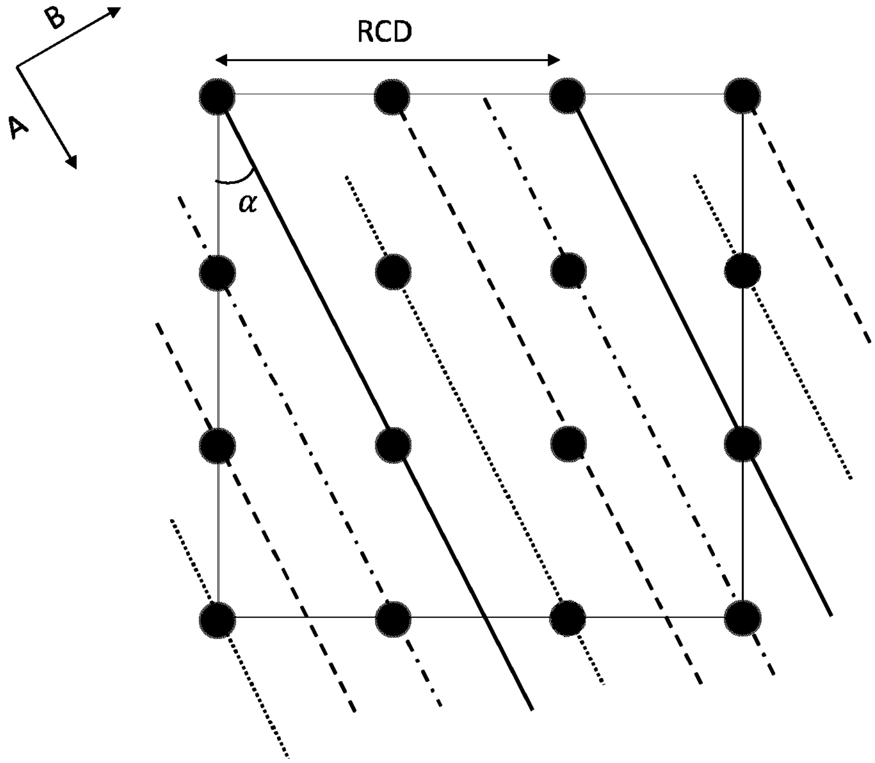
FIG. 3 illustrates a further example of addressing a two-dimensional array of emitters according to the present invention.

Similarly, FIG. 3 illustrates a further example of addressing a two-dimensional array of emitters. Same as the example in FIG. 2, the axes of the Cartesian coordinate system are also rotated through an angle (α) as compared to the row and column of the two-dimensional array. Note that as compared to the previous examples, the repeated code lines break in parts by wrapping. With the rotation angle (α) of arctangent (0.5)-degree in FIG. 3, it leads to a minimum Repeated Code Distance (RCD) of "2d" between the wrapped lines, considering that along the lines the code distance is even larger ($\sqrt{5}$d). Therefore, the example shown in FIG. 3 is optimum for a 4×4 emitter array, and the code sequences assigned to neighboring emitters are fully orthogonal.

In summary, the efficiency of a beam selection procedure can be improved by encoding a N×N emitter array by 2N CDMA codes. To maximize the orthogonality between code sequences assigned to neighboring emitters, it is ideal to maximize the minimum Repeated Code Distance (RCD). The disclosed method can be applied to matrices of any size, e.g., N×M with N≠M. The configuration when RCD is maximized may depend on the actual size of the matrix. In another word, the optimal rotation angle (α) may need to be adjusted according to the actual size of the two-dimensional array.

Figure 4:
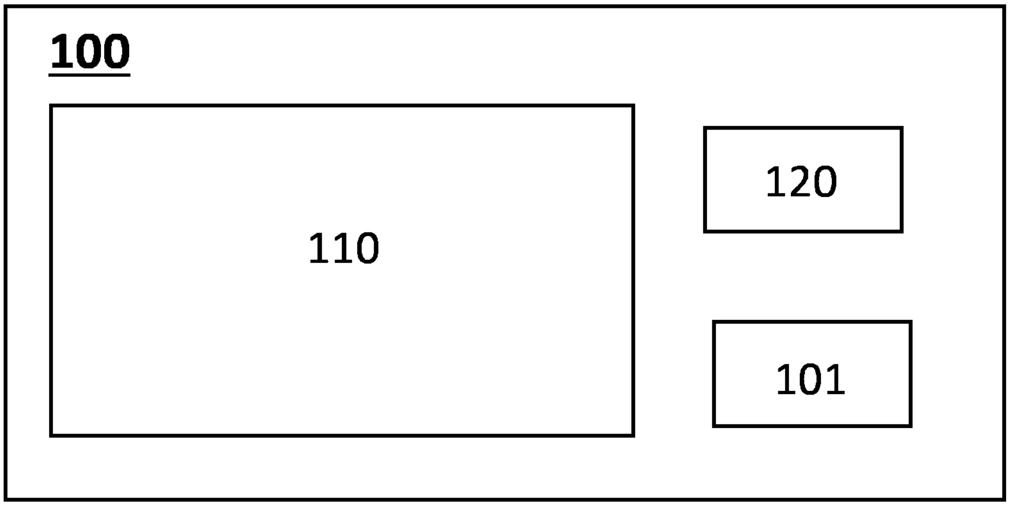
FIG. 4 demonstrates a block diagram of an optical wireless communication device.

FIG. 4 demonstrates a block diagram of an optical wireless communication device 100. The optical wireless communication device 100 comprises at least a two-dimensional array of emitters 110, a receiver 120, and a controller 101. Each emitter is arranged to emit an optical signal and having an individual coverage area; wherein the two-dimensional array of emitters 110 is arranged to create a combined coverage area larger than the individual coverage area, with each individual coverage area evenly distributed within the combined coverage area. The receiver 120 is configured to receive a feedback from a remote device in the combined coverage area. The controller 101 is configured to assign an address to each emitter out of the two-dimensional array of emitters 110, with each address comprising a pair of codes representing coordinates on an X-axis and a Y-axis, respectively, according to a Cartesian coordinate system, to uniquely identify each emitter in the Cartesian coordinate system. Each emitter out of the two-dimensional array of emitters 110 is configured to send a beacon signal comprising its address for assisting the remote device to provide the feedback, with the plurality of emitters configured to send beacon signals according a Code-Division Multiple Access; and the controller 101 is configured to select an emitter out of the two-dimensional array of emitters 110 for establishing an optical wireless data link with the remote device according to the feedback received from the remote device.

Figure 5:
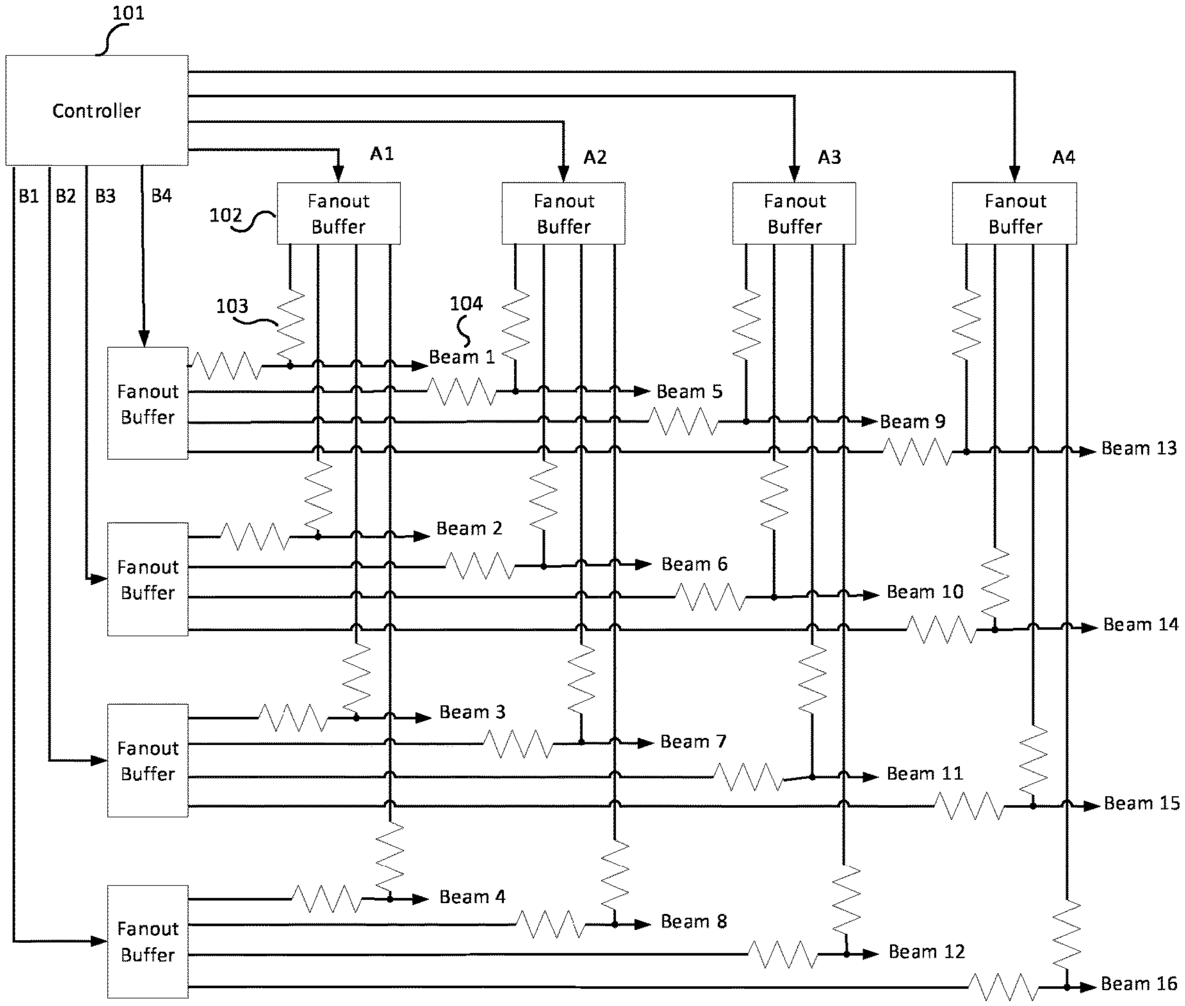
FIG. 5 shows an implementation example of address generation in an optical wireless communication device.

FIG. 5 shows an implementation example of address generation in an optical wireless communication device. For simplicity, the example in FIG. 5 is corresponding to the addressing method used in FIG. 1. A controller 101, which may be a microcontroller, generates 8 different CDMA codes on 8 different pins (4 per row, 4 per column). Each pin is connected to a fanout buffer 102, to be able to sum each code of a specific row with every column code without interfering each other. This sum is performed by adding a resistor 103 per line of the output buffer. This will generate a three-level signal per beam 104, which will contain the sum of the row and column codes.

The reduction of required number of CDMA codes also leads to reduced receiver complexity. As mentioned earlier, the signal strength detection per beam will be compared according to:

$$A_{beam} = Rx \otimes (CDMA_{Ai} + CDMA_{Bj})$$

For implementation efficiency it is preferable to split this calculation in two separate parts:

$$a_i = Rx \otimes (CDMA_{Ai})$$

$$b_i = Rx \otimes (CDMA_{Bj})$$

$$A_{beam} = a_i + b_j$$

Figure 6:
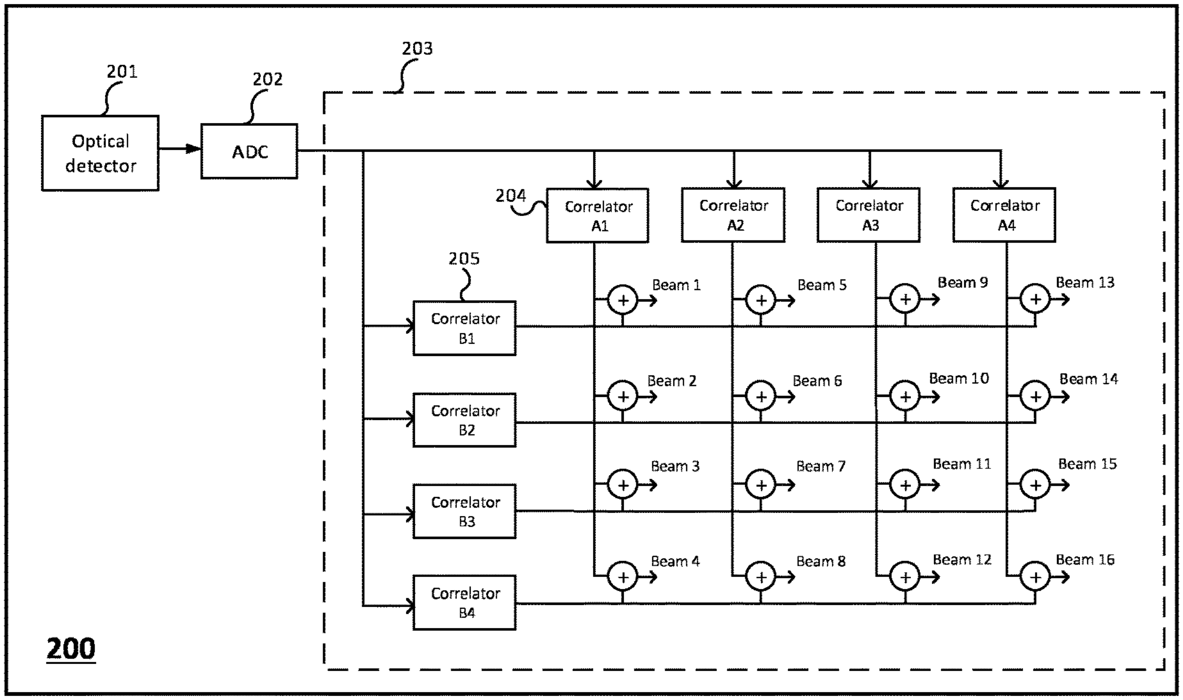
FIG. 6 shows an implementation example of a remote optical receiver.

The terms $a_i$ and $b_j$ can be reused for multiple beams. FIG. 6 shows a functional diagram of the beam decoding in a remote optical receiver. The signal is collected by an optical detector 201 and fed to an ADC 202, which can be external or integrated in the controller of the optical receiver. The controller 203 then will perform the correlation of the received signal with the 8 possible correlators, 4 per row 205 and 4 per column 204. By summing the correlator output ($a_i$ and $b_j$) of each row-column correlator pair, the combined correlator amplitude can be obtained for each possible beam. The beam with the strongest correlation result will then be selected as the optimal received beam. And the address indicated in the code pair will be provided as a feedback to the optical transmitter.

The methods according to the invention may be implemented on a computer as a computer implemented method, or in dedicated hardware, or in a combination of both.

Executable code for a method according to the invention may be stored on computer/machine readable storage means. Examples of computer/machine readable storage means include non-volatile memory devices, optical storage medium/devices, solid-state media, integrated circuits, servers, etc. Preferably, the computer program product comprises non-transitory program code means stored on a computer readable medium for performing a method according to the invention when said program product is executed on a computer.

Methods, systems, and computer-readable media (transitory and non-transitory) may also be provided to implement selected aspects of the above-described embodiments.

The invention claimed is:

1. An optical wireless communication device comprising:

a two-dimensional array of emitters each emitter arranged to emit an optical signal and having an individual coverage area; wherein the two-dimensional array of emitters is arranged to create a combined coverage area larger than the individual coverage area, with each individual coverage area evenly distributed within the combined coverage area;

a receiver configured to receive a feedback from a remote device in the combined coverage area; and, a controller configured to assign an address to each emitter out of the two-dimensional array of emitters, each address comprising a pair of codes representing coordinates on an X-axis and a Y-axis, respectively, according to a Cartesian coordinate system, to uniquely identify each emitter in the Cartesian coordinate system;

wherein each emitter out of the two-dimensional array of emitters is configured to send a beacon signal comprising its address for assisting the remote device to provide the feedback, with the plurality of emitters configured to send beacon signals according a Code-Division Multiple Access; and the controller is configured to select an emitter out of the two-dimensional array of emitters for establishing an optical wireless data link with the remote device according to the feedback received from the remote device.

2. The optical wireless communication device of claim 1, wherein the codes used in the Cartesian coordinate system to address the emitters are orthogonal to each other.

3. The optical wireless communication device of claim 1, wherein the axes of the Cartesian coordinate system are aligned with the row and column of the two-dimensional array horizontally and vertically.

4. The optical wireless communication device of claim 1, wherein the axes of the Cartesian coordinate system are rotated through an angle as compared to the row and column of the two-dimensional array to increase a minimum separation distance between any two emitters out of the two-dimensional array sharing a same X-axis or Y-axis coordinate.

5. The optical wireless communication device of claim 4, wherein the angle is arctangent (0.5)-degree.

6. The optical wireless communication device of claim 1, wherein the receiver is an RF receiver.

7. The optical wireless communication device of claim 1, wherein the receiver is an optical receiver.

8. The optical wireless communication device of claim 7, wherein the optical receiver is further configured to receive an optical data signal in a bi-directional optical wireless data link.

9. The optical wireless communication device of claim 1, wherein the two-dimensional array of emitters is arranged in a matrix along two orthogonal directions or in a hexagonal structure along two directions.

10. An optical wireless communication system comprising:

an optical wireless communication device (100) according to claim 1;

a remote optical receiver comprising:

at least one photodiode configured to detect a plurality of beacon signals sent by the optical wireless communication device;

a controller configured to decode a first address comprised in a beacon signal with a highest received signal strength out of the plurality of beacon signals;

wherein the remote optical receiver is configured to provide a feedback on the first address to the optical wireless communication device, and the optical wireless communication device is configured to select a corresponding emitter according to the first address indicated in the feedback to establish an optical wireless communication link with the remote optical receiver.

11. The optical wireless communication system of claim 10, wherein the controller of the remote optical receiver is configured to calculate cross-correlation results between the detected plurality of beacon signals with each of the codes used as coordinates in the Cartesian coordinate system of the optical wireless communication device, and to sum the cross-correlation results for each pair of codes representing coordinates on the X-axis and the Y-axis of the Cartesian coordinate system to derive a relative signal strength for each beacon signal, and the beacon signal with a highest received signal strength is selected according to the relative signal strength.

12. The optical wireless communication system of claim 10, wherein the remote optical receiver further comprises an RF transmitter or an optical transmitter to send the feedback on the first address to the optical wireless communication device.

13. A beam selection method of an optical wireless communication device, the method comprising:

emitting an optical signal and having an individual coverage area by each emitter out of a two-dimensional array of emitters of the optical wireless communication device;

creating a combined coverage area by the two-dimensional array of emitters, with the combined coverage area larger than an individual coverage area of an emitter out of the two-dimensional array of emitters and each individual coverage area evenly distributed within the combined coverage area;

assigning an address to each emitter out of the two-dimensional array of emitters, each address comprising a pair of codes representing coordinates on an X-axis and a Y-axis, respectively, according to a Cartesian coordinate system, to uniquely identify each emitter in the Cartesian coordinate system;

sending by each emitter a beacon signal comprising its assigned address for assisting a remote device to provide a feedback;

sending beacon signals by the plurality of emitters according to a Code-Division Multiple Access;

receiving the feedback from the remote device in the combined coverage area; and selecting an emitter out of the two-dimensional array of emitters for establishing an optical wireless data link according to the feedback received from the remote device.

14. A method for assisting a beam selection method according to claim 13 by a remote optical receiver, the method comprising:

detecting a plurality of beacon signals sent by the optical wireless communication device;

decoding a first address comprised in a beacon signal with a highest received signal strength out of the plurality of beacon signals; and providing a feedback on the first address to the optical wireless communication device.

15. The method of claim 14 further comprising:

calculating cross-correlation results between the detected plurality of beacon signals with each of the codes used as coordinates in the Cartesian coordinate system of the optical wireless communication device;

summing the cross-correlation results for each pair of codes representing coordinates on the X-axis and the Y-axis of the Cartesian coordinate system to derive a relative signal strength for each beacon signal; and selecting the beacon signal with the highest received signal strength according to the relative signal strength.

* * * * *